US010003420B2

(12) United States Patent
Long et al.

(10) Patent No.: US 10,003,420 B2
(45) Date of Patent: Jun. 19, 2018

(54) METHODS AND SYSTEMS FOR SUGGESTING ADDITIONAL CONTENT

(71) Applicant: Rovi Guides, Inc., Santa Clara, CA (US)

(72) Inventors: Jeff Long, Brookline, MA (US); Peter Boonstra, Arlington, MA (US)

(73) Assignee: Rovi Guides, Inc., San Jose, CA (US)

( * ) Notice: Subject to any disclaimer, the term of this patent is extended or adjusted under 35 U.S.C. 154(b) by 0 days. days.

(21) Appl. No.: 14/743,368

(22) Filed: Jun. 18, 2015

(65) Prior Publication Data

US 2016/0373194 A1    Dec. 22, 2016

(51) Int. Cl.
*H04N 7/173*     (2011.01)
*H04B 17/309*    (2015.01)
*H04N 21/231*    (2011.01)
*H04N 21/234*    (2011.01)
*H04N 21/24*     (2011.01)
*H04N 21/2665*   (2011.01)
*H04N 21/462*    (2011.01)
*H04N 21/482*    (2011.01)
*H04B 17/23*     (2015.01)

(52) U.S. Cl.
CPC ........... *H04B 17/309* (2015.01); *H04B 17/23* (2015.01); *H04N 21/231* (2013.01); *H04N 21/23418* (2013.01); *H04N 21/2407* (2013.01); *H04N 21/2665* (2013.01); *H04N 21/4622* (2013.01); *H04N 21/4826* (2013.01)

(58) Field of Classification Search
CPC .... H04N 21/231; H04N 21/234; H04N 21/24; H04N 21/4784; H04N 21/2543; H04N 21/2665; H04N 21/462
See application file for complete search history.

(56) References Cited

U.S. PATENT DOCUMENTS

| | | | |
|---|---|---|---|
| 6,239,794 B1 | 5/2001 | Yuen | |
| 6,388,714 B1 | 5/2002 | Schein | |
| 6,564,378 B1 | 5/2003 | Satterfield | |
| 6,756,997 B1 | 6/2004 | Ward | |
| 7,165,098 B1 | 1/2007 | Boyer | |
| 7,761,892 B2 | 7/2010 | Ellis | |
| 8,046,801 B2 | 10/2011 | Ellis | |
| 9,282,355 B2 * | 3/2016 | Tiraspolsky | ......... H04N 21/472 |
| 2002/0174430 A1 | 11/2002 | Ellis | |
| 2003/0005452 A1 * | 1/2003 | Rodriguez | ............... H04N 7/08 |
| | | | 725/86 |

(Continued)

*Primary Examiner* — John Schnurr
(74) *Attorney, Agent, or Firm* — Haley Guiliano LLP

(57) ABSTRACT

Methods and systems are disclosed for a media guidance application that mitigates the frustration that a user experiences in response to encountering poor-quality media content. For example, in response to determining that media content (e.g., a television program) received/retrieved by a user is of low quality, the media guidance application may recommend one or more actions to alleviate the user's frustration. For example, the media guidance application may find a high-quality version of the media content, offer discounts, credits, etc., on the low-quality media content, find an alternative source of the media content, etc. Alternatively or additionally, the media guidance application may recommend related media content (e.g., a different television program) and/or offer discounts, credits, etc., for the related media content.

16 Claims, 4 Drawing Sheets

(56) References Cited

U.S. PATENT DOCUMENTS

| | | | |
|---|---|---|---|
| 2003/0046704 A1* | 3/2003 | Laksono | H04N 7/17336 |
| | | | 725/96 |
| 2003/0110499 A1 | 6/2003 | Knudson | |
| 2005/0251827 A1 | 11/2005 | Ellis | |
| 2006/0127039 A1* | 6/2006 | van Stam | G06F 3/0481 |
| | | | 386/216 |
| 2009/0193482 A1* | 7/2009 | White | H04N 7/17318 |
| | | | 725/110 |
| 2010/0153885 A1 | 6/2010 | Yates | |
| 2010/0186025 A1* | 7/2010 | Thomas | G06F 3/0481 |
| | | | 725/5 |
| 2011/0047569 A1* | 2/2011 | Mears | H04N 5/4401 |
| | | | 725/39 |
| 2012/0284749 A1* | 11/2012 | Lee | H04N 21/235 |
| | | | 725/39 |
| 2014/0157307 A1* | 6/2014 | Cox | H04N 21/4331 |
| | | | 725/34 |

\* cited by examiner

METHODS AND SYSTEMS FOR SUGGESTING ADDITIONAL CONTENT

BACKGROUND

In conventional systems, users have access to a plethora of media content. Additionally, that media content is available from a plethora of sources. For example, media content may be received via a broadcast source or an on-demand source or may be retrieved from local or removable storage. In any of these cases, receiving, retrieving, and/or playing back the media content involves the risk that the media content may be of poor quality (e.g., be corrupted or suffer from data loss). For example, a poor television signal may affect the receipt of a broadcast program, and a damaged CD disk may affect the playback of a CD. Furthermore, in response to encountering these issues, users, in addition to being unable to access the media content, may become frustrated with the source of the media content (e.g., a television provider).

SUMMARY

Accordingly, methods and systems are disclosed herein for a media guidance application that mitigates the frustration that a user experiences in response to encountering poor quality media content. For example, in response to determining that media content (e.g., a television program) received/retrieved by a user is of low quality, the media guidance application may recommend one or more actions to alleviate the user's frustration. For example, the media guidance application may find a high-quality version of the media content, offer discounts, credits, etc. on the low-quality media content, find an alternative source of the media content, etc. Alternatively or additionally, the media guidance application may recommend related media content (e.g., a different television program) and/or offer discounts, credits, etc., for the related media content.

In some aspects, the media guidance application may store a first transmission of a first media asset. For example, the media guidance application may permanently store recorded programs or may temporarily store on-demand or buffered broadcasts. After storing the first transmission of the first media asset, the media guidance application may determine a quality metric for the first media asset. For example, the quality metric may quantify (e.g., in the form a percentage, ratio, etc.) a level of corruption of the first media asset.

The media guidance application may then compare the quality metric to a quality threshold. For example, the quality threshold may indicate a particular level of corruption (e.g., a level at which the first media asset is unacceptable for consumption by the user) that triggers a particular response from the media guidance application. In response to determining that the quality metric does not exceed the quality threshold, the media guidance application may generate for display an offer for a second media asset (e.g., selected based on a similarity to the first media asset) to a user. For example, the offer for the second media asset may include a coupon, discount, etc. aimed at reducing the frustration of the user that the first media asset has a poor quality metric. Additionally or alternatively, the media guidance application may base the value, size, or amount of the coupon, discount, etc., on the quality metric for the first media asset. For example, as the quality metric decreases, the media guidance application may determine to increase the value, size, or amount.

In some embodiments, the media guidance application may determine whether a second transmission of the first media asset is available in response to determining that the quality metric does not exceed the quality threshold. For example, the media guidance application may first determine what other media assets are available before recommending, or offering discounts for, any particular media asset. Additionally or alternatively, the media guidance application may determine whether or not the first media asset is available from a different content provider in response to determining that the quality metric does not exceed the quality threshold. For example, in response to determining that the first media asset available from a first source has a low quality, the media guidance application may determine whether or not the first media asset is available, or available in a higher quality than the first source, from a second source.

In some embodiments, the media guidance application may base the value, size, or amount of a coupon, discount, etc., and/or whether or not a second media asset is offered, on the length of time until a different/new version of the first media asset is available. For example, in order to reduce the frustration of a user in receiving a poor quality version of the first media asset, the media guidance application may offer a coupon to compensate for any delays, or a second media asset for consumption during any delays, while the media guidance application locates a new version of the first media asset. For example, the media guidance application may determine a length of time until a second transmission of the first media asset is available in response to determining that the quality metric does not exceed the quality threshold. The media guidance application may then compare the length of time to a threshold length of time (e.g., a length of time indicative of when a user will become frustrated). In response to determining that the length of time exceeds the threshold length of time, the media guidance application may select the second media asset. Furthermore, the media guidance application may select a second media asset based on the length of time. For example, the media guidance application may determine that a longer wait corresponds to a longer second media asset (e.g., for consumption during the wait) or a larger coupon (e.g., to compensate the user for the wait).

In some embodiments, the media guidance application may generate for display an offer for a third media asset in response to determining that the quality metric exceeds the quality threshold. For example, in response to determining that the quality of the first media asset is not low enough to cause frustration in the user, the media guidance application may offer related media content (e.g., available for purchase).

It should be noted that the systems and/or methods described above may be applied to, or used in accordance with, other systems, methods, and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
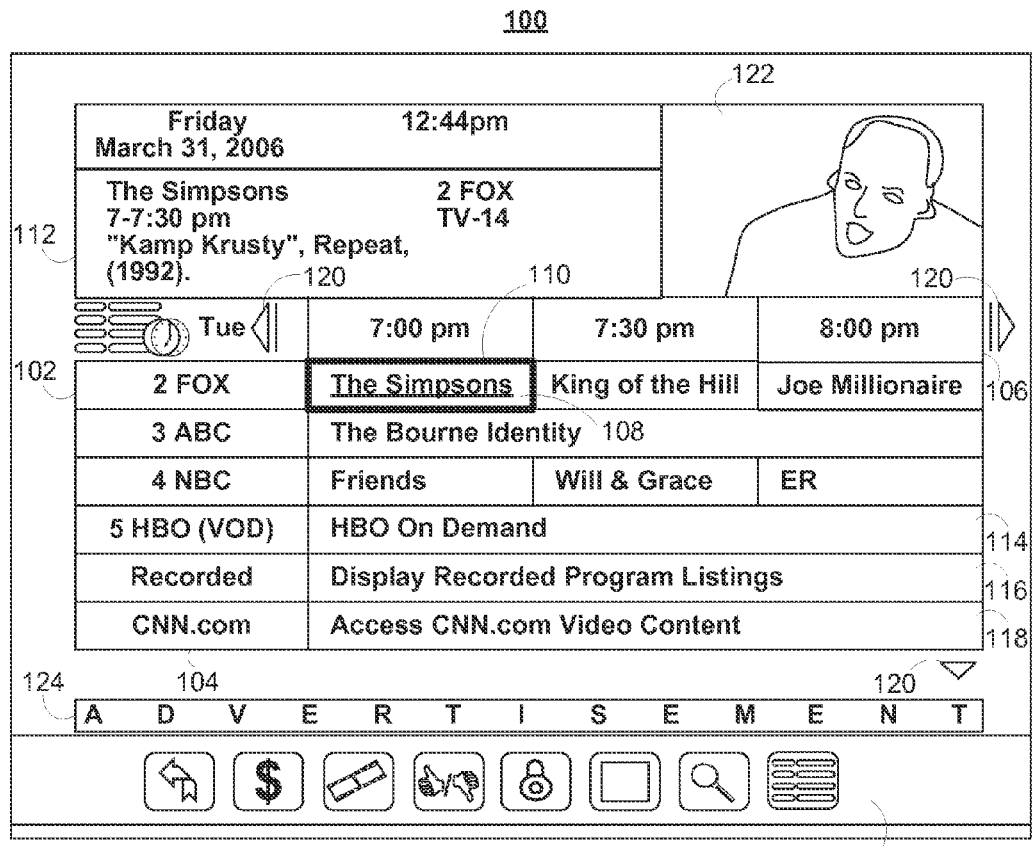
FIG. 1 shows an illustrative example of a display screen generated by a media guidance application in accordance with some embodiments of the disclosure.

Methods and systems are disclosed herein for a media guidance application that mitigates the frustration that a user experiences in response to encountering poor quality media content. For example, in response to determining that media content (e.g., a television program) received/retrieved by a user is of low quality, the media guidance application may recommend one or more actions to alleviate the user's frustration. For example, the media guidance application may find a high-quality version of the media content, offer discounts, credits, etc.' on the low-quality media content, find an alternative source of the media content, etc. Alternatively or additionally, the media guidance application may recommend related media content (e.g., a different television program) and/or offer discounts, credits, etc., for the related media content.

As referred to herein, a "media guidance application" or simply "guidance application" is an application that allows a user to access media content through an interface. Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, Random Access Memory ("RAM"), etc.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

In some embodiments, the media guidance application may store a first transmission of a first media asset. As referred to herein, a "transmission" refers to a consumable copy or version of a media asset. A transmission may correspond to a particular broadcast of a program at a particular time by a particular provider. For example, a broadcast of a program at 7:00 PM on a first channel may constitute a different transmission than a broadcast of the same program at 8:00 PM on the first channel, both of which may constitute different transmissions than a broadcast of the same program at 7:00 PM on a second channel. For example, a transmission may be defined by its provider (e.g., a particular channel, content provider, etc.), the time at which it was available (e.g., a time the program was broadcast, recorded, available on-demand, etc.), the method of delivery (e.g., broadcast, on-demand, etc.), or any other characteristic for distinguishing between two copies or versions of a media asset in which the content is substantially the same.

The media guidance application may store the media asset in a plurality of ways. For example, the media guidance application may permanently store recorded programs (e.g., locally or remotely) or may temporarily store media assets (e.g., when accessing on-demand content or buffering broadcast content) on a user device.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same.

In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

After storing the first transmission of the first media asset, the media guidance application may determine a quality metric for the first media asset. As referred to herein, a "quality metric" is a qualitative (e.g., a descriptive word such as good, bad, etc., or other subjective determination) or quantitative (e.g., a ranking, percentage, ratio, etc.) representation of the quality of a received media asset. For example, the quality metric may quantify a level of corruption of the first media asset. For example, the media guidance application may detect data corruption such as errors in computer data that occur during writing, reading, storage, transmission, or processing, which introduce unintended changes to the original data. The media guidance application may assign a numerical value to the amount of this corruption. Alternatively or additionally, the quality metric may indicate whether or not a user will be frustrated by the quality of a received media asset. For example, the media guidance application may input the numerical value representing a level of corruption into a lookup table database. The lookup table database may list a particular acceptable level of corruption (i.e., a level of corruption at which a particular user will become frustrated). The database may include entries specific to each user and/or each media asset. For example, the media guidance application may determine that some users can tolerate more corruption than others. This information may be based on prior user history and/or feedback from one or more users. In another example, the media guidance application may determine that some media assets can have a higher amount of corruption without a user becoming frustrated than other media assets. This information may also be based on prior user history and/or feedback from one or more users. The information used to populate the database may be received from a user (e.g., via active monitoring such as querying a user or passive monitoring such as tracking user history or clickstream data). Alternatively or additionally, the database may be populated based on industry or third party data. For example, media guidance data associated with each media asset (and received by the media guidance application) may include data for use in the database.

In some embodiments, the quality metric itself may be data transmitted with the first media asset or media guidance data associated with the first media asset. Alternatively, the media guidance application may determine (e.g., locally) a quality metric associated with a received media asset. For example, the media guidance application may process a received media asset to determine if any portions of the media asset are corrupted and the degree to which the portions are corrupted.

For example, the media guidance application may analyze captured audio or video data to determine words, objects in frames of the media asset, media guidance data associated with the media asset, etc. For example, the media guidance application may access a content recognition module or algorithm to determine the objects in received data (e.g., a captured video). The content recognition module may use object recognition techniques such as edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique or method to determine the objects and/or relationship between the objects in the received data. The media guidance application may then compare the captured data to uncorrupted data in order to determine whether or not the captured data is corrupted.

For example, the media guidance application may receive data in the form of a video (e.g., captured via a content capture device at a location of the user). The video may include a series of frames. For each frame of the video, the media guidance application may use a content recognition module or an algorithm to determine the objects in each of the frames or series of frames. The media guidance application may then compare a known, uncorrupted frame (e.g., retrieved from storage) to determine whether or not the received frame is corrupted.

In some embodiments, the media guidance application may use a series of checksums or hashsums to detect corruption. For example, a checksum may be transmitted with a media asset (e.g., as metadata), and minor changes (e.g., corruption) to the media asset may cause a checksum algorithm to output a significantly different value than the value that was inputted.

As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

The media guidance application may then compare the quality metric to a quality threshold. As referred to herein, a "quality threshold" is a particular value of a quality metric that triggers a response from the media guidance application. The value of the quality threshold and/or the response triggered may be particular to the user and/or the media asset. For example, the quality threshold may indicate a particular level of corruption (e.g., a level at which the first media asset is unacceptable for consumption by the user) that triggers a particular discount (or an amount of a discount) from the media guidance application.

To determine one or more quality thresholds for a media asset (or a user), the media guidance application may input the media asset (e.g., a serial number corresponding to the media asset), the user identity, and/or any other information used to determine a specific quality threshold for a user and/or media asset into a lookup table database. The lookup table database may list the various quality thresholds for each available media asset, including quality thresholds specific to a user as well as offers that should be presented to a user in response to a quality metric exceeding a particular quality threshold. The database may include entries specific to each user and/or each media asset. For example, the media guidance application may determine that some users can tolerate more corruption than others (thus the quality threshold for those users may be higher). This information may be based on prior user history and/or feedback from one or more users. In another example, the media guidance application may determine that some media assets can have a higher amount of corruption than other media assets without a user becoming frustrated (thus the quality threshold for those media assets may be higher). Finally, the media guidance application may determine that some quality thresholds, if exceeded, are more likely to risk user frustration (thus, offers associated with those thresholds may be more valuable than those associated with other thresholds). This information may also be based on prior user history and/or feedback from one or more users. The information used to populate the database may be received from a user (e.g., via active monitoring such as querying a user or passive monitoring such as tracking user history or clickstream data). Alternatively or additionally, the database may be populated based on industry or third party data. For example, media guidance data associated with each media asset (and received by the media guidance application) may include data for use in the database.

For example, the offer for the second media asset may include a coupon, discount, etc., aimed at reducing the frustration of the user that the first media asset has a poor quality metric. Additionally or alternatively, the media guidance application may base the value, size, or amount of the coupon, discount, etc., on the quality metric for the first media asset. For example, as the quality metric decreases, the media guidance application may determine to increase the value, size, or amount of the offer. [but, see paragraph 35]

In response to determining that the quality metric does not exceed the quality threshold (e.g., the quality metric does not correspond to a high enough quality such that the user will not be frustrated), the media guidance application may generate for display an offer for a second media asset (e.g., selected based on a similarity to the first media asset) to a user. Alternatively, the media guidance application may generate for display an offer for a third media asset in response to determining that the quality metric exceeds the quality threshold. For example, in response to determining that the quality of the first media asset is not low enough to cause frustration in the user, the media guidance application may offer related media content (e.g., available for purchase).

In some embodiments, the media guidance application may determine whether a second transmission of the first media asset is available in response to determining that the quality metric does not exceed the quality threshold. For example, the media guidance application may first determine what other media assets are available before recommending, or offering discounts for, any particular media asset. Additionally or alternatively, the media guidance application may determine whether or not the first media asset is available from a different content provider in response to determining that the quality metric does not exceed the quality threshold. For example, in response to determining that the first media asset available from a first source has a low quality, the media guidance application may determine whether or not the first media asset is available, or available in a higher quality than the first source, from a second source.

As referred to herein, an "offer" refers to any product or service, or an advertisement for a product or service, that may be presented to a user. For example, an offer may be an offer for a media asset and/or a product related to a media asset. In some embodiments, an offer may appear as an advertisement for a product or service. In some embodiments, an offer may include a discount or coupon.

In some embodiments, the media guidance application may base the value, size, or amount of a coupon, discount, etc., and/or whether or not a second media asset is offered, or on the length of time until a different/new version of the first media asset is available. For example, in order to reduce the frustration of a user in receiving a poor-quality version of the first media asset, the media guidance application may offer a coupon to compensate for any delays, or a second media asset for consumption during any delays, while the media guidance application locates a new version of the first media asset. For example, the media guidance application may determine a length of time until a second transmission of the first media asset is available in response to determining that the quality metric does not exceed the quality threshold. The media guidance application may then compare the length of time to a threshold length of time (e.g., a length of time indicative of when a user will become frustrated). In response to determining that the length of time exceeds the threshold length of time, the media guidance application may select the second media asset. Furthermore, the media guidance application may select a second media asset based on the length of time. For example, the media guidance application may determine that a longer wait corresponds to a longer second media asset (e.g., for consumption during the wait) or a larger coupon (e.g., to compensate the user for the wait).

Figure 2:
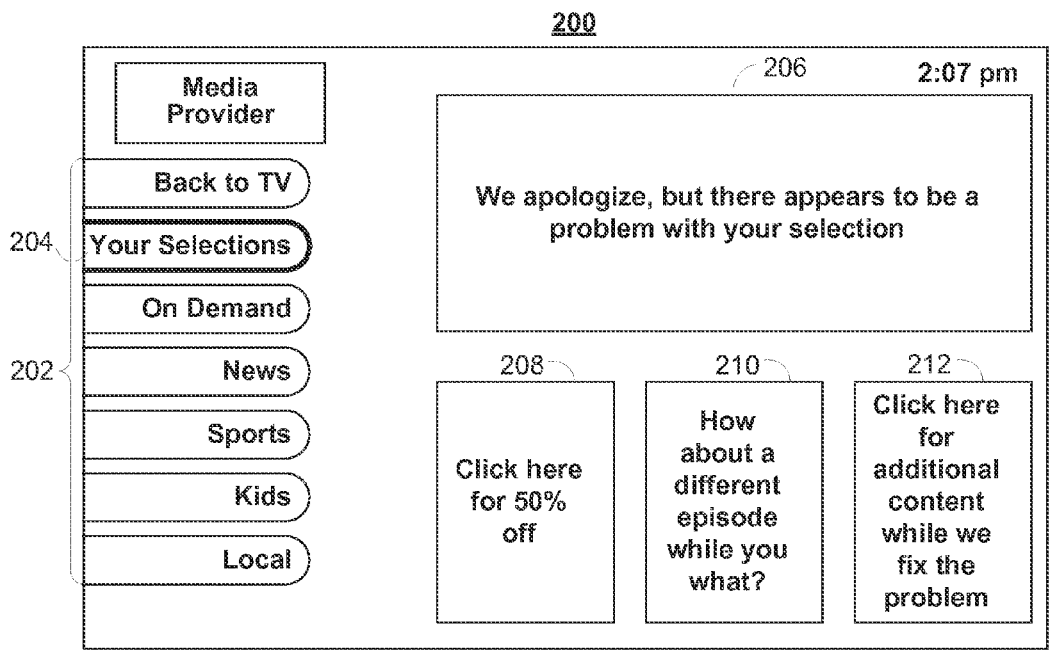
FIG. 2 shows another illustrative example of a display screen generated by a media guidance application featuring offerings generated in response to a first media asset having a low-quality metric in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, user selection option 204 is selected, thus providing listings 206. However, as indicated by the on-screen text, there is a problem with the transmission of listing 206. For example, the media guidance application has determined that a quality metric associated with the transmission is below a threshold quality metric. In response, the media guidance application has generated a plurality of offers for the user. Accordingly, the media guidance application has generated offers 208, 210, and 212.

For example, offer 208 presents the user with a coupon for 50% of another transmission of the media asset associated with listing 206. Offer 210 offers the user access to a second media asset that the user may consume while the user waits for the media guidance application to obtain an uncorrupted transmission of the media asset associated with listing 206. Likewise, offer 212 offers the user access to additional content (e.g., cast interviews, outtakes, director commentary, etc.) associated with the media asset associated with listing 206 that the user may consume while the user waits for the media guidance application to obtain an uncorrupted transmission of the media asset associated with listing 206.

In display 200, the offers may provide graphical images including cover art, still images associated with the content, video clip previews, live video from the content, or other types of content that indicate to a user the content being described by the media guidance application in the offer. Each of the offers may also be accompanied by text to provide further information about the content associated with the offer.

In some embodiments, the offers may be presented in different sizes, but if desired, all the offers may be the same size. Offers may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
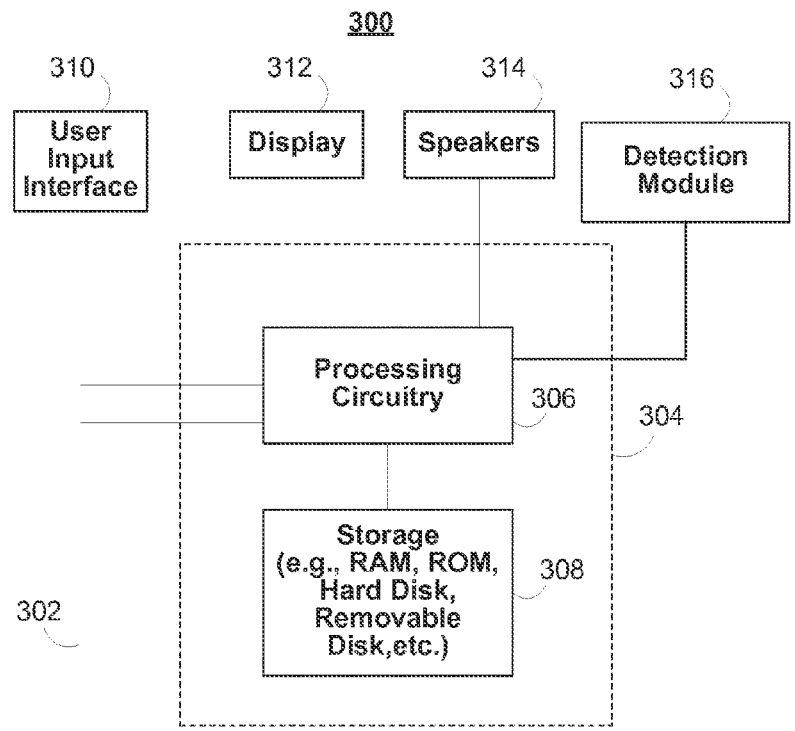
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
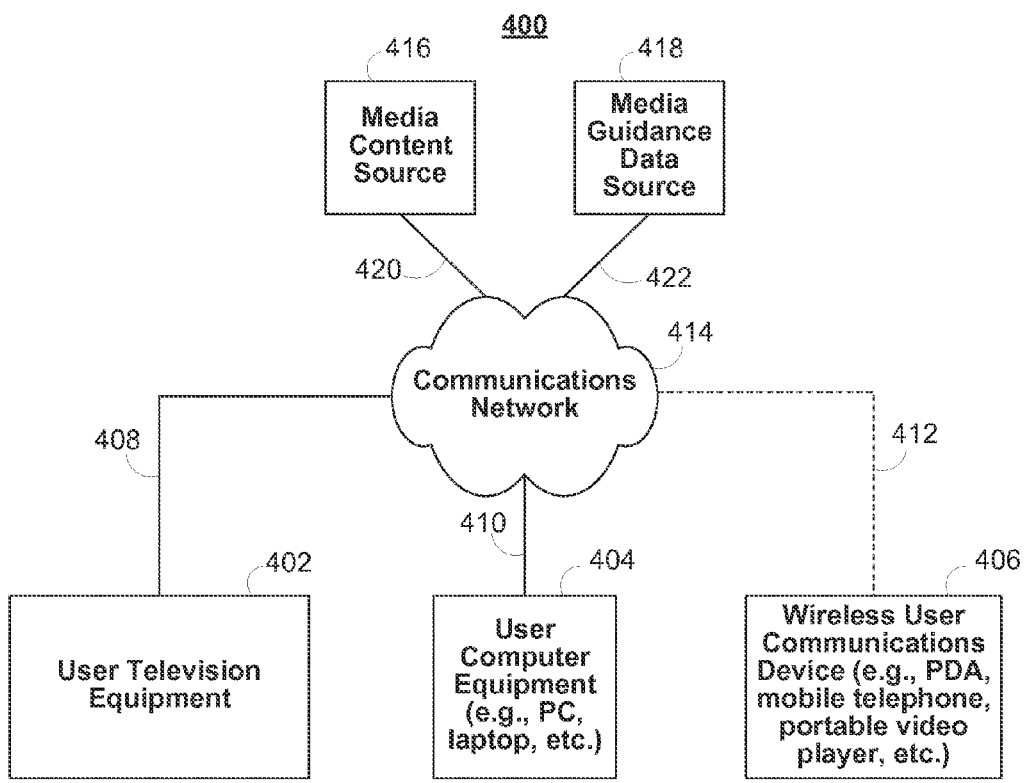
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
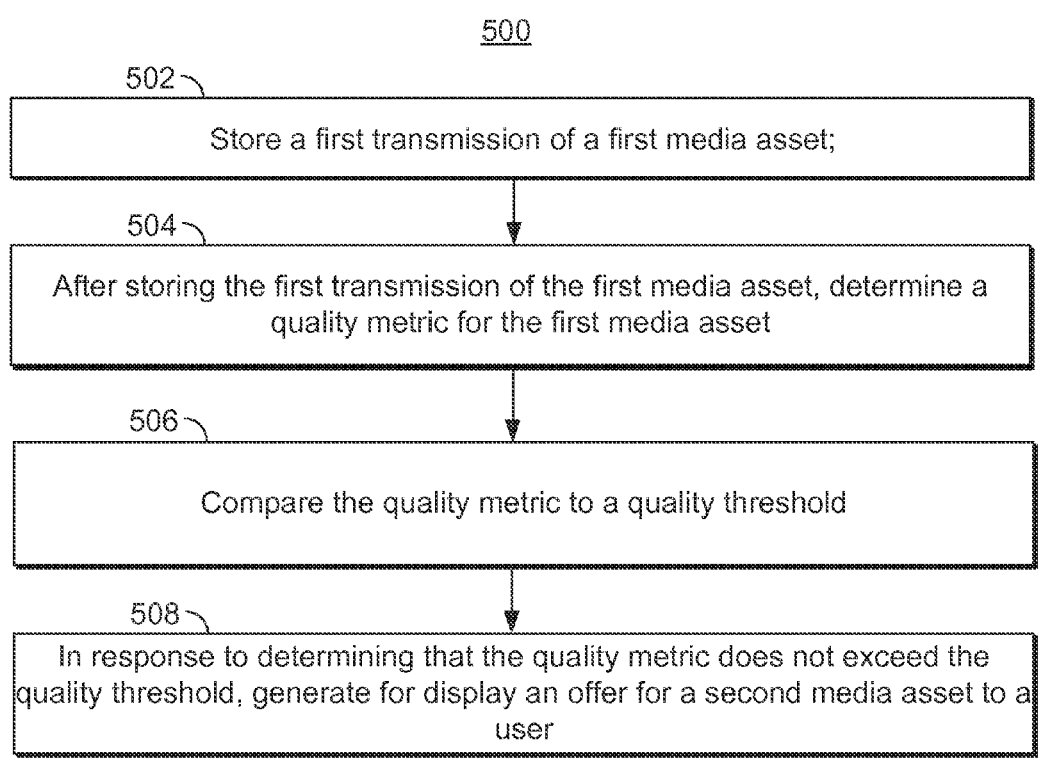
FIG. 5 is a flowchart of illustrative steps for generating for display an offer for a second media asset in accordance with some embodiments of the disclosure.

FIG. 5 is a flowchart of illustrative steps for generating for display an offer for a second media asset. It should be noted that process 500, or any step thereof, could be performed on, or provided by, any of the devices shown in FIGS. 3-4. For example, process 500 may be executed by control circuitry 304 (FIG. 3) as instructed by a media guidance application implemented on user equipment 402, 404, and/or 406 (FIG. 4) in order to generate for display an offer for a second media asset. In addition, one or more steps of process 500 may be incorporated into or combined with one or more steps of any other process or embodiment (e.g., process 600 (FIG. 6)).

At step 502, the media guidance application stores (e.g., in storage 308 (FIG. 3) and/or any location accessible via communications network 414 (FIG. 4)) a first transmission of a first media asset. For example, the media guidance application may (e.g., via control circuitry 304 (FIG. 3)) permanently store recorded programs or may temporarily store on-demand or buffered broadcasts. For example, the media guidance application may receive a download of an on-demand movie rental. The rental may be temporarily stored on a local device of the user (e.g., in order to enable the user to view the movie).

At step 504, after storing (e.g., in storage 308 (FIG. 3) and/or any location accessible via communications network 414 (FIG. 4)) the first transmission of the first media asset, the media guidance application determines (e.g., via control circuitry 304 (FIG. 3)) a quality metric for the first media asset. For example, the quality metric may quantify (e.g., in the form a percentage, ratio, etc.) a level of corruption of the first media asset. For example, upon storing the movie (or, alternatively, while the media guidance application streams the movie), the media guidance application may use (e.g., via control circuitry 304 (FIG. 3)) a checksum function to determine a level of corruption of the movie.

At step 506, the media guidance application compares (e.g., via control circuitry 304 (FIG. 3)) the quality metric to a quality threshold (e.g., retrieved from storage 308 (FIG. 3) and/or any location accessible via communications network 414 (FIG. 4)). For example, the quality threshold may indicate a particular level of corruption (e.g., a level at which the first media asset is unacceptable for consumption by the user) that triggers a particular response from the media guidance application. For example, the media guidance application may determine whether or not the movie is too corrupted for the user to enjoy. For example, the media guidance application may retrieve a quality threshold, which indicates a maximum level of corruption at which a movie may be presented to a user without the user being dissatisfied. If the media guidance application determines that the quality metric of the movie does not correspond to the quality threshold, the media guidance application may attempt to rectify the situation.

In response to determining that the quality metric does not exceed the quality threshold, the media guidance application generates for display (e.g., on display 312 (FIG. 3)) an offer for a second media asset (e.g., selected based on a similarity to the first media asset) to a user, at step 608. For example, the offer for the second media asset may include a coupon, discount, etc., aimed at reducing the frustration of the user that the first media asset has a poor quality metric. Additionally or alternatively, the media guidance application may determine (e.g., via control circuitry 304 (FIG. 3)) the value, size, or amount of the coupon, discount, etc., on the quality metric for the first media asset. For example, as the quality metric decreases, the media guidance application may determine (e.g., via control circuitry 304 (FIG. 3)) to increase the value, size, or amount to compensate for the poor quality metric.

In some embodiments, the media guidance application may determine (e.g., via control circuitry 304 (FIG. 3)) whether a second transmission of the first media asset is available (e.g., from storage 308 (FIG. 3), media content source 416 (FIG. 4), and/or any location accessible via communications network 414 (FIG. 4)) in response to determining that the quality metric does not exceed the quality threshold. For example, the media guidance application may first determine (e.g., via control circuitry 304 (FIG. 3)) what other media assets are available before recommending, or offering discounts for, any particular media asset. Additionally or alternatively, the media guidance application may determine (e.g., via control circuitry 304 (FIG. 3)) whether or not the first media asset is available from a different content provider in response to determining that the quality metric does not exceed the quality threshold. For example, in response to determining (e.g., via control circuitry 304 (FIG. 3)) that the first media asset available from a first source has a low quality, the media guidance application may determine (e.g., via control circuitry 304 (FIG. 3)) whether or not the first media asset is available, or available in a higher quality than the first source, from a second source.

In some embodiments, the media guidance application may base the value, size, or amount of a coupon, discount, etc., and/or whether or not a second media asset is offered, on the length of time until a different/new version of the first media asset is available. For example, in order to reduce the frustration of a user in receiving a poor-quality version of the first media asset, the media guidance application may offer a coupon to compensate for any delays, or a second media asset for consumption during any delays, while the media guidance application locates a new version of the first media asset. For example, the media guidance application may determine (e.g., via control circuitry 304 (FIG. 3)) a length of time until a second transmission of the first media asset is available in response to determining that the quality metric does not exceed the quality threshold. The media guidance application may then compare (e.g., via control circuitry 304 (FIG. 3)) the length of time to a threshold length of time (e.g., a length of time indicative of when a user will become frustrated). In response to determining (e.g., via control circuitry 304 (FIG. 3)) that the length of time exceeds the threshold length of time, the media guidance application may select (e.g., via control circuitry 304 (FIG. 3)) the second media asset. Furthermore, the media guidance application may select a second media asset based on the length of time. For example, the media guidance application may determine (e.g., via control circuitry 304 (FIG. 3)) that a longer wait corresponds to a longer second media asset (e.g., for consumption during the wait) or a larger coupon (e.g., to compensate the user for the wait).

In some embodiments, the media guidance application may generate for display an offer for a third media asset in response to determining that the quality metric exceeds the quality threshold. For example, in response to determining (e.g., via control circuitry 304 (FIG. 3)) that the quality of the first media asset is not low enough to cause frustration in the user, the media guidance application may offer related media content (e.g., available for purchase).

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 5.

Figure 6:
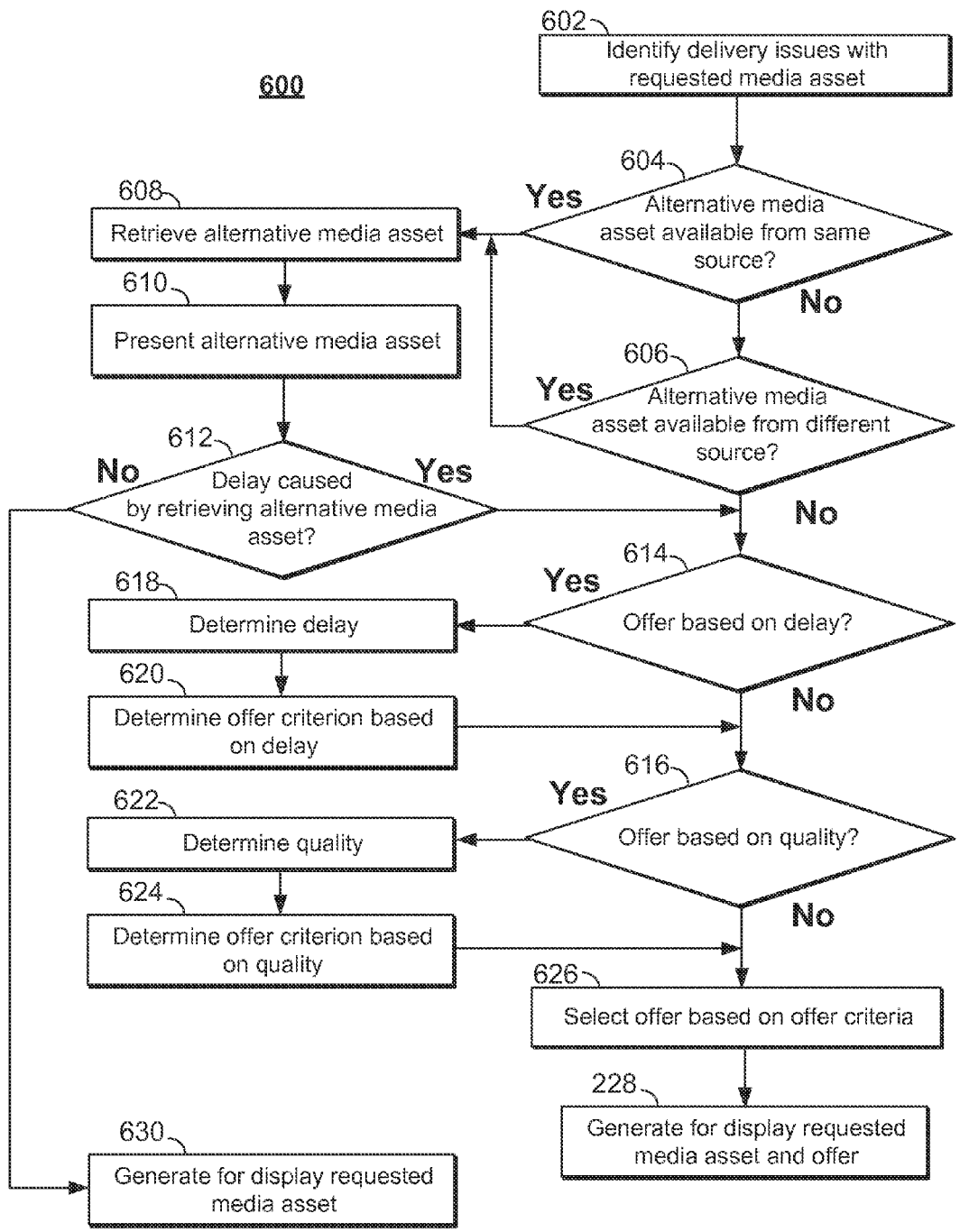
FIG. 6 is a flowchart of illustrative steps for selecting an offer in accordance with some embodiments of the disclosure.

FIG. 6 is a flowchart of illustrative steps for selecting an offer. It should be noted that process 600, or any step thereof, could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4) in order to select an offer. In addition, one or more steps of process 600 may be incorporated into or combined with one or more steps of any other process or embodiment (e.g., process 500 (FIG. 5)).

At step 602, the media guidance application identifies (e.g., via control circuitry 304 (FIG. 3)) delivery issues with a media asset. For example, the media guidance application may determine (e.g., via control circuitry 304 (FIG. 3)) that a received media asset is corrupted. In another example, the media guidance application may determine that a media asset that was scheduled to be recorded was not recorded. In yet another example, the media guidance application may determine that due to connectivity issues, a media asset is currently unavailable.

At step 604, the media guidance application determines (e.g., via control circuitry 304 (FIG. 3)) whether or not an alternative media asset is available from the same source. For example, if the media guidance application determines (e.g., via control circuitry 304 (FIG. 3)) that a first transmission of a media asset from a broadcast source is corrupted, the media guidance application determines whether or not a second transmission of the media asset is available from the broadcast source. If the media guidance application determines that an alternative media asset is available from the same source, the media guidance application proceeds to step 608. If the media guidance application determines that an alternative media asset is not available from the same source, the media guidance application proceeds to step 606.

At step 606, the media guidance application determines (e.g., via control circuitry 304 (FIG. 3)) whether or not an alternative media asset is available from a different source. For example, if the media guidance application determines (e.g., via control circuitry 304 (FIG. 3)) that a first transmission from a broadcast source is corrupted, the media guidance application determines whether or not a second transmission of the media asset is available from an on-demand source, a different broadcast source, etc. If the media guidance application determines that an alternative media asset is available from a different source, the media guidance application proceeds to step 608. If the media guidance application determines that an alternative media asset is not available from a different source, the media guidance application proceeds to step 614.

At step 608, the media guidance application retrieves (e.g., via control circuitry 304 (FIG. 3)) the alternative media asset. For example, after determining that an alternative media asset is available, the media guidance application retrieves the alternative media asset and presents the alternative media asset at step 610, before proceeding to step 612.

At step 612, the media guidance application determines (e.g., via control circuitry 304 (FIG. 3)) whether or not a delay in the presentation of the media asset was caused by retrieving the alternative media asset. For example, if the media guidance application was forced to retrieve an alternative media asset due to delivery issues, the media guidance application determines if a user had to wait to receive the alternative media asset. If so, the media guidance application proceeds to step 614. If the media guidance application determines there was not a delay in presentation of the media asset caused by retrieving the alternative media asset, the media guidance application proceeds to step 630. At step 630, the media guidance application generates (e.g., via control circuitry 304 (FIG. 3)) for display (e.g., on display 312 (FIG. 3)) the requested media asset.

At step 614, the media guidance application determines (e.g., via control circuitry 304 (FIG. 3)) whether or not to present an offer based on the delay. For example, if the media guidance application determines there was a delay, the media guidance application may determine to present an offer to the user to compensate for the delay. If the media guidance application determines (e.g., via control circuitry 304 (FIG. 3)) not to present an offer based on the delay, the media guidance application proceeds to step 616. If the media guidance application determines (e.g., via control circuitry 304 (FIG. 3)) to present an offer based on the delay, the media guidance application proceeds to step 618.

At step 618, the media guidance application determines (e.g., via control circuitry 304 (FIG. 3)) a length of the delay. For example, the media guidance application may incorporate a timer function that can determine how long a transmission of the requested media asset was delayed. At step 620, the media guidance application determines (e.g., via control circuitry 304 (FIG. 3)) an offer criterion based on the delay. For example, the media guidance application may cross-reference the delay with a database (e.g., located at storage 308 (FIG. 3) and/or any location accessible via communication network 414 (FIG. 4)) listing criteria for offers that are appropriate for the determined delay. For example, the database may indicate that for longer delays, offers of higher value are appropriate. The media guidance application then proceeds to step 616.

At step 616, the media guidance application determines (e.g., via control circuitry 304 (FIG. 3)) whether or not to present an offer based on the quality of the requested media asset. For example, if the media guidance application determines the requested media asset has quality issues, the media guidance application may determine to present an offer to the user to compensate for the issues. If the media guidance application determines (e.g., via control circuitry 304 (FIG. 3)) not to present an offer based on the quality, the media guidance application proceeds to step 626. If the media guidance application determines (e.g., via control circuitry 304 (FIG. 3)) to present an offer based on the quality, the media guidance application proceeds to step 622.

At step 622, the media guidance application determines (e.g., via control circuitry 304 (FIG. 3)) the quality of the requested media asset. For example, the media guidance application may incorporate a checksum function that can determine a quality level of the requested media asset that was delayed. At step 624, the media guidance application determines (e.g., via control circuitry 304 (FIG. 3)) an offer criterion based on the quality. For example, the media guidance application may cross-reference the quality with a database (e.g., located at storage 308 (FIG. 3) and/or any location accessible via communication network 414 (FIG. 4)) listing criteria for offers that are appropriate for the determined quality. For example, the database may indicate that for lower quality, offers of higher value are appropriate. The media guidance application then proceeds to step 626.

At step 626, the media guidance application determines (e.g., via control circuitry 304 (FIG. 3)) and selects an offer based on the offer criteria. For example, the media guidance application may cross-reference the offer criteria with a database (e.g., located at storage 308 (FIG. 3) and/or any location accessible via communication network 414 (FIG. 4)) listing offers that match the criteria to determine an offer to present to the user. The media guidance application may then generate (e.g., via control circuitry 304 (FIG. 3)) for display (e.g., on display 312 (FIG. 3)) the requested media asset and the offer.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for supplementing poor quality media assets, the method comprising:
   storing a first transmission of a first media asset;
   after storing the first transmission of the first media asset, processing the stored first media asset to determine a quality metric for the first media asset;
   comparing the quality metric to a quality threshold;
   in response to determining that the quality metric does not exceed the quality threshold, determining an amount of compensation based on the quality metric;
   generating for display an offer for a second media asset to a user, wherein the offer corresponds to the amount of compensation; and
   in response to determining that the quality metric does exceed the quality threshold, generating for display an offer for a third media asset.

2. The method of claim 1, further comprising offering the user a discount on a cost of the first media asset based on the quality metric.

3. The method of claim 1, further comprising determining whether a second transmission of the first media asset is available in response to determining that the quality metric does not exceed the quality threshold.

4. The method of claim 1, further comprising determining whether the first media asset is available from a different content provider in response to determining that the quality metric does not exceed the quality threshold.

5. The method of claim 1, further comprising:
   determining a length of time until a second transmission of the first media asset is available in response to determining that the quality metric does not exceed the quality threshold;
   comparing the length of time to a threshold length of time; and
   in response to determining that the length of time exceeds the threshold length of time, selecting the second media asset.

6. The method of claim 5, wherein the second media asset is selected based on the length of time.

7. The method of claim 1, wherein the quality metric quantifies a level of corruption of the first media asset.

8. The method of claim 1, further comprising selecting the second media asset based on a similarity of the second media asset to the first media asset.

9. A system for supplementing poor quality media assets, the system comprising:
   storage circuitry configured to store a first transmission of a first media asset; and
   control circuitry configured to:
      after storing the first transmission of the first media asset, process the stored first media asset to determine a quality metric for the first media asset;
      compare the quality metric to a quality threshold;
      in response to determining that the quality metric does not exceed the quality threshold, determine an amount of compensation based on the quality metric;
      generate for display an offer for a second media asset to a user, wherein the offer corresponds to the amount of compensation; and
      in response to determining that the quality metric does exceed the quality threshold, generate for display an offer for a third media asset.

10. The system of claim 9, wherein the control circuitry is further configured to offer the user a discount on a cost of the first media asset based on the quality metric.

11. The system of claim 9, wherein the control circuitry is further configured to determine whether a second transmission of the first media asset is available in response to determining that the quality metric does not exceed the quality threshold.

12. The system of claim 9, wherein the control circuitry is further configured to determine whether the first media asset is available from a different content provider in response to determining that the quality metric does not exceed the quality threshold.

13. The system of claim 9, wherein the control circuitry is further configured to:

determine a length of time until a second transmission of the first media asset is available in response to determining that the quality metric does not exceed the quality threshold;

compare the length of time to a threshold length of time; and in response to determining that the length of time exceeds the threshold length of time, select the second media asset.

14. The system of claim 13, wherein the second media asset is selected based on the length of time.

15. The system of claim 9, wherein the quality metric quantifies a level of corruption of the first media asset.

16. The system of claim 9, wherein the control circuitry is further configured to select the second media asset based on a similarity of the second media asset to the first media asset.

* * * * *